United States Patent [19]

Leason

[11] Patent Number: 4,828,694

[45] Date of Patent: May 9, 1989

[54] FILTER WITH FILTRATION ENVELOPE SPACING MEANS

[75] Inventor: Hayden Leason, Humacao

[73] Assignee: Filtertek, Inc., Hebron, Ill.

[21] Appl. No.: 142,071

[22] Filed: Jan. 11, 1988

[51] Int. Cl.⁴ .......................................... B01D 35/06
[52] U.S. Cl. .................................. 210/168; 210/314; 210/416.5; 210/445
[58] Field of Search ............... 210/168, 232, 314, 316, 210/416.1, 416.4, 416.5, 445, 474–477, 481

[56] References Cited

U.S. PATENT DOCUMENTS

| | | | |
|---|---|---|---|
| 3,784,011 | 1/1974 | Ward | 210/168 |
| 4,402,827 | 9/1983 | Joseph | 210/314 |
| 4,410,341 | 10/1983 | Edwards et al. | 210/445 X |
| 4,450,081 | 5/1984 | Anderson et al. | 210/445 |
| 4,600,511 | 7/1986 | Sherman et al. | 210/316 |
| 4,604,200 | 8/1986 | Machart | 210/314 |

Primary Examiner—Charles Hart
Attorney, Agent, or Firm—Willian Brinks Olds Hofer Gilson & Lione Ltd.

[57] ABSTRACT

A fluid filter for use in a fluid system wherein fluid is forced through the filter by a suction source connected to the filter outlet is disclosed. In addition to a housing defining a volume, with an inlet and an outlet, and a filtration media envelope inside said volume, the filter further includes an envelope spacing means to support the envelope against collapse, and fluid flow spacing means between the housing and the envelope. In a preferred embodiment, the envelope spacing means comprises a grid assembly inside the envelope, connected to the housing inlet to maintain proper positioning.

23 Claims, 4 Drawing Sheets

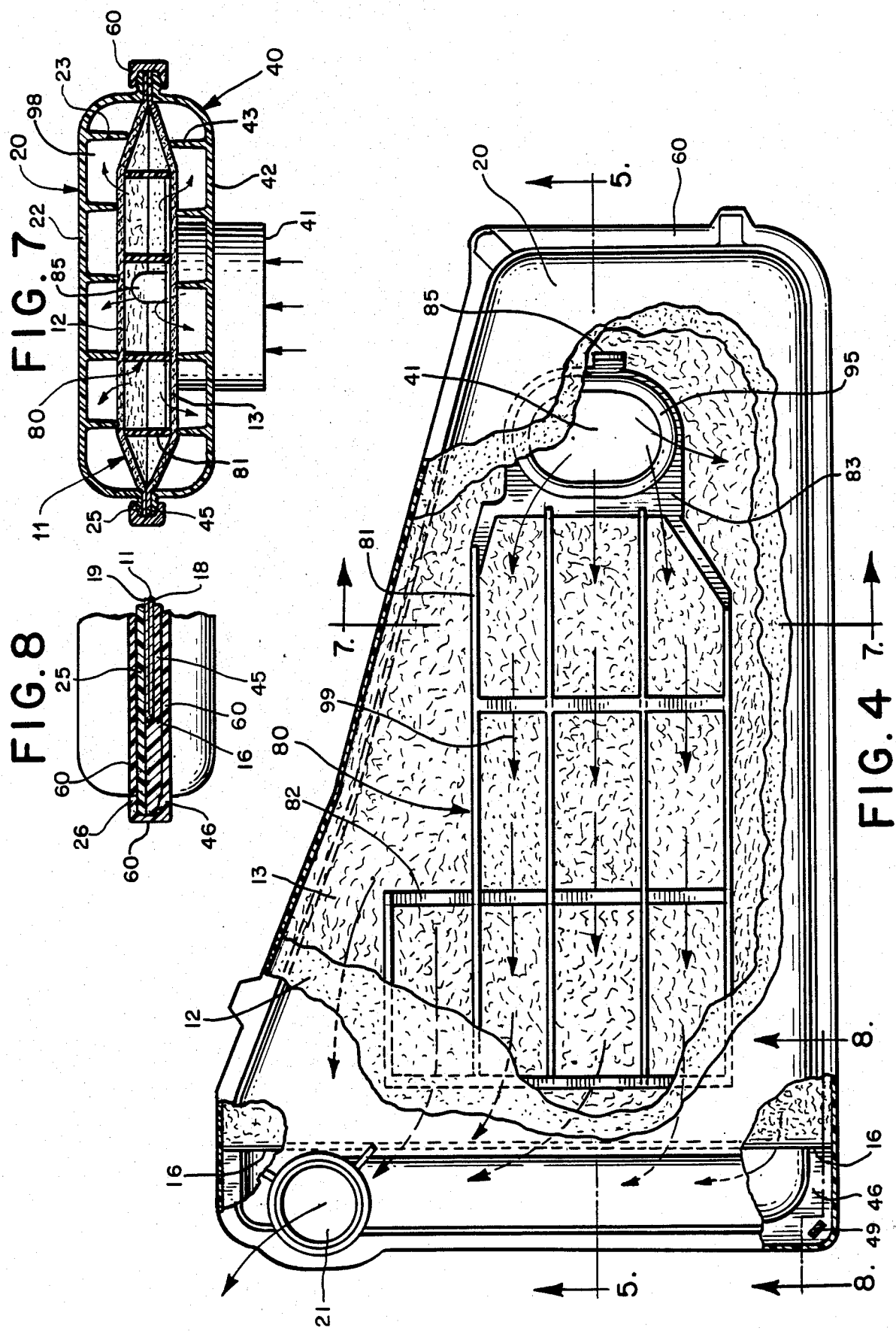

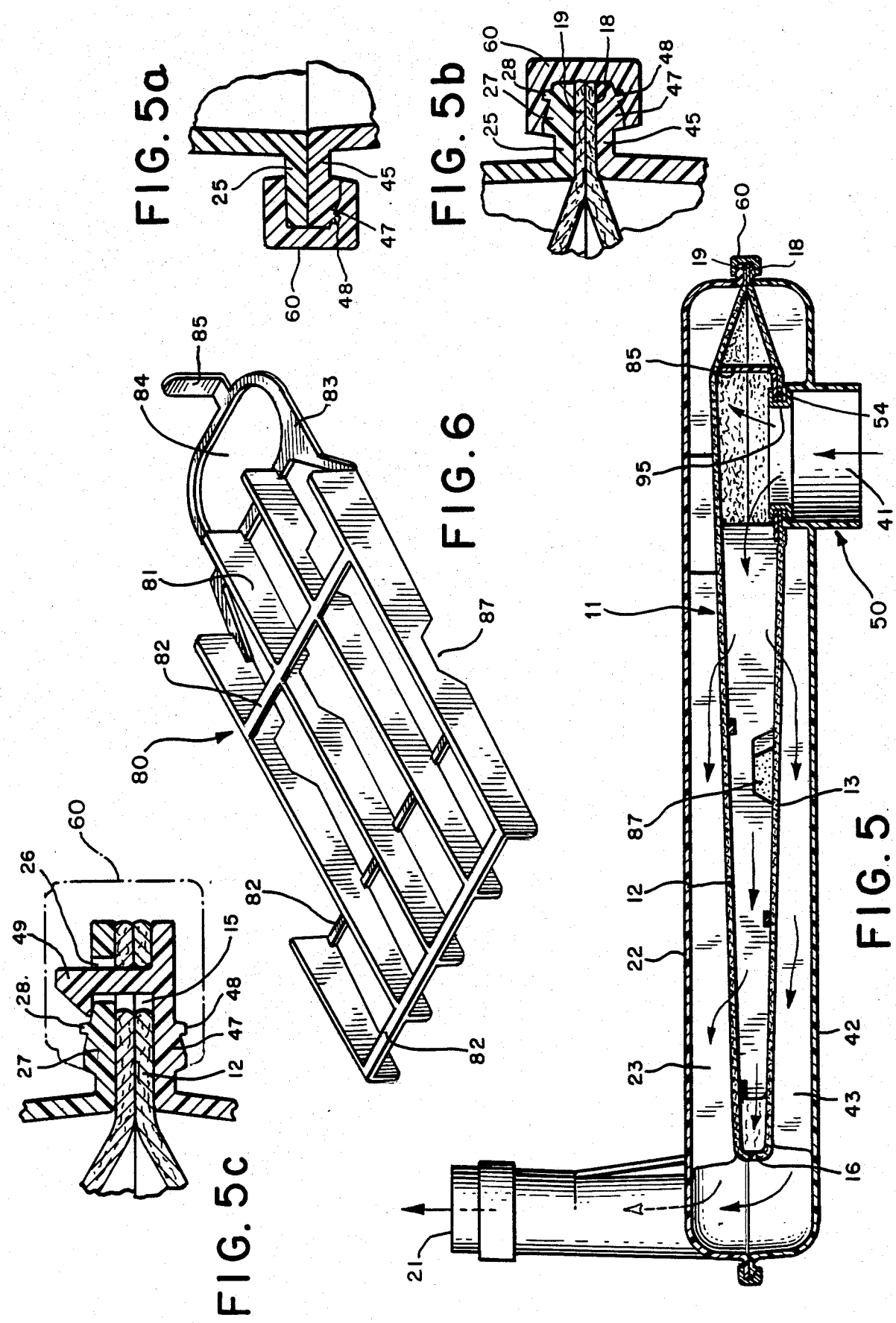

FILTER WITH FILTRATION ENVELOPE SPACING MEANS

BACKGROUND OF THE INVENTION

This invention relates to fluid filters, and more particularly to automatic transmission fluid filters which require a minimum flow rate at low operating temperatures.

Automatic transmissions require a filter to remove harmful materials from the fluid being circulated through the transmission system. Various configurations of filters have been suggested for use in automatic transmission fluid circulating systems. One such filter is disclosed in U.S. Pat. No. 4,402,827 to Joseph. This filter is made from two generally rectangular cup-shaped pan members having flanged peripheries fastened together in opposed relation. A filter element envelope is made in part from a long piece of resin-impregnated felt folded over double, and in part from a smaller piece of nylon mesh that replaces an area of the felt material in a window-like fashion. The edges of the filter element are captured between the fastened flange sections of the pan members.

In filters of the disclosed design, a pump creates suction which draws fluid from a sump, into the filter, through the walls of the envelope and through the outlet of the filter. Because of this suction, the pressure on the inside of the envelope is less than the pressure on the outside, and raised bosses are typically provided on the pan members to support the filter media to prevent it from contacting the walls of the pan members.

During testing of filters constructed similar to this fashion, it was found that insufficient flow rates were produced during low temperature operations. Increasing the surface area and porosity of the filter media were considered to improve the situation, but were undesirable from the standpoint of filter size or filter inefficiency.

It was discovered that placing a grid inside the filter envelope to maintain the spacing between the sheets of the envelope improved the flow rate. Thus it appeared that, contrary to expected behavior, the filter envelope was collapsing during low temperature operation, and a spacer means solved the problem.

SUMMARY OF THE INVENTION

A fluid filter has been invented for use in a system wherein fluid is forced through the filter by a suction source connected to the filter outlet, wherein the filter media envelope is supported against collapse upon itself by an envelope spacer means. The filter has a housing with an inlet and an outlet; a filtration material envelope inside the volume defined by the housing, with an envelope opening connected to the housing inlet; an envelope spacer means which supports the filtration envelope against collapse; and fluid flow spacing means to provide a fluid flow path between the outside of the envelope and the filter outlet.

In the preferred embodiment, the envelope spacer means comprises a plastic grid produced by standard injection molding techniques. The grid is located within the filtration media envelope. The spacer grid supports the filter media envelope from collapse upon itself, and thus alleviates the problem of inadequate fluid flow at low temperatures.

Other advantages of the present invention, as well as the invention itself, will best be understood in view of the following detailed description of the presently preferred embodiments.

BRIEF DESCRIPTION OF THE DRAWINGS

FIG. 4 is a broken top view of the preferred embodiment of FIG. 2.

FIG. 5 is a sectional side view of taken along line 5—5 of FIG. 4.

FIGS. 5a and 5b are enlarged sectional views of the filter periphery shown in FIG. 5.

FIG. 5c is an enlarged sectional view of the periphery of the filter of FIG. 5 showing the construction of a positioning tang.

FIG. 6 is a perspective view of the spacer grid of the preferred embodiment of FIG. 2.

FIG. 7 is a sectional side view taken along line 7—7 of FIG. 4.

FIG. 8 is another sectional side view taken along line 8—8 of FIG. 4.

DETAILED DESCRIPTION OF THE PREFERRED EMBODIMENTS

Figure 1:
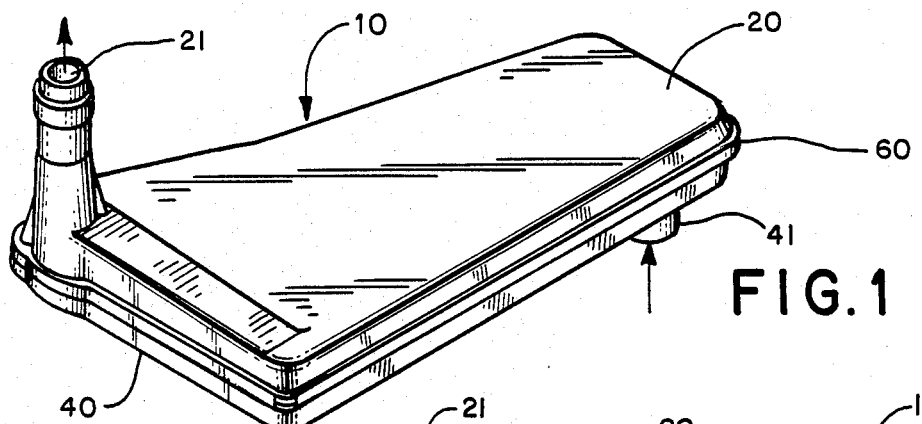
FIG. 1 is a perspective view of a filter of the preferred embodiments of the present invention.

Two presently preferred embodiments are shown in the drawings. However, their external appearance from the vantage point of FIG. 1 is identical.

Figure 2:
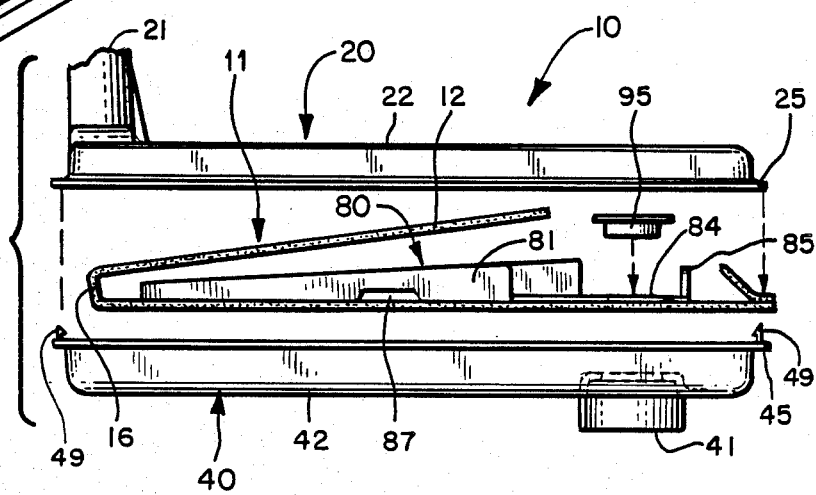
FIG. 2 is a side view assembly drawing of one preferred embodiment of the filter of FIG. 1.

One presently preferred embodiment of the invention is shown in FIG. 2. Fluid filter 10 comprises two pan members, a cover pan member 20 placed in opposed relation to a bottom pan member 40, sealingly fastened by a hermetically sealing overmold 60. The overmold 60 is similar to the overmold disclosed in U.S. Pat. No. 4,113,627 to Hayden Leason, the disclosure of which is hereby incorporated by reference. A filtration media envelope 11 is enclosed in the volume created by the pan members 20 and 40, and is supported against collapse upon itself by an envelope spacer grid 80, which thus acts as an envelope spacer means. The fluid enters the filter through inlet 41, passes through filtration media 11, and then exits the filter through outlet 21.

Figure 3:
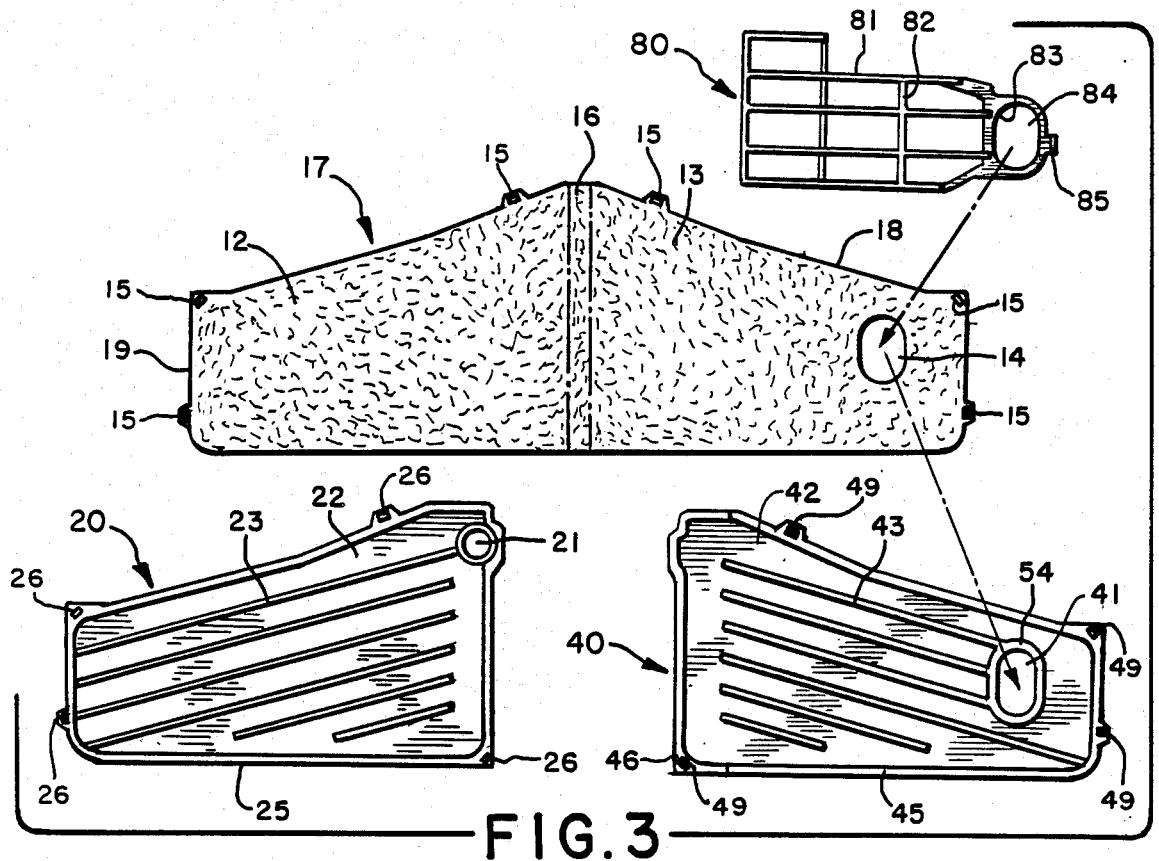
FIG. 3 is a top view assembly drawing of the preferred embodiment of the spacer grid, filter media and pan members of FIG. 2. The cover pan member is shown flipped open.

As shown in FIGS. 2 and 3, cover pan member 20 is a generaly cup-shaped plastic shell comprising a generally flat base wall 22 and a peripheral flanged edge 25 which lies in an offset plane parallel to, and which extends outward from, the edge of base wall 22. Positioning holes 26 through sections of flanged edge 25 are provided at several points around the periphery of the filter. Circular shaped outlet 21 extends upward perpendicularly from the edge of base wall 22. Outlet 21 connects to a source of suction (not shown), such as the fluid pump of an automatic transmission. Generally parallel fluid flow spacer elements 23 extend perpendicularly down from, and are integral with, the underside of base wall 22 (best seen in FIG. 7).

As shown in FIGS. 2 and 3, bottom pan member 40 is a generally cup-shaped plastic shell comprising a generally flat base wall 42 and a peripheral flanged edge 45 which lies in an offset plane parallel to, and which extends outward from the edge of base wall 42. Locating tangs 49 are positioned at several points around the periphery of the filter, upstanding from flanged edge 45. Generally parallel fluid flow spacer elements 43 extend upward from, and are integral with, the top side of base wall 42 (best seen in FIG. 7).

As best shown in FIG. 5, inlet 41 is formed by an elliptical tube 50 that extends perpendicularly both downward and upward from base wall 42 and is integral therewith. Elliptical inlet tube 50 has a. flanged grommet support 54 at its top edge, which is essentially planar with the top sides of fluid flow spacing elements 43.

As shown in FIG. 3, the filtration media envelope 11 comprises a sheet of filtration material 17 folded upon itself at edge 16 and includes an opening 14 which is identical in shape to inlet 41. The sheet 17 includes positioning holes 15 at several places around its periphery. During assembly, the locating tangs 49 and the positioning holes 15 and 26 are used to properly position the folded sheet 17 and the cover members 20 and 40, as shown in FIG. 5c. Non-folded edge 18 of lower sheet section 13 and non-folded edge 19 of upper sheet section 12 are brought together and are sealingly captured between the peripheral flanged edge 25 of cover pan member 20 and peripheral flanged edge 45 of bottom pan member 40 (best seen FIG. 5b)As shown in FIG. 7, pan members 20 and 40 are hermetically sealed together in opposed relation by plastic overmold 60 to form volume 98, enclosing filtration media envelope 11. At the position of the tangs 49, the thickness of the overmold 60 is slightly increased to completely seal the periphery of the filter 10.

Edges 18 and 19 of filtration media envelope 11 do not extend all the way around the periphery of the filter. As shown in FIGS. 3 and 8, peripheral edge 45 therefore includes raised edge 46. Raised edge 46 begins on both sides of the filter 10 at folded edge 16 of filtration media envelope 11 and continues around the outlet end of the fluid filter.

As shown in FIG. 7, fluid flow spacing elements 23 support upper sheet 12 of filtration media envelope 11 from making contact with cover base wall 22. Likewise, fluid flow spacing elements 43 support lower sheet section 13 of filtration media envelope 11 from making contact with base wall 42. As shown in FIG. 3, fluid flow spacing elements 23 extend from folded edge 16 of filtration media envelope 11 to peripheral edges 25 along the inlet side of the fluid filter. Fluid flow spacing elements 43 extend from folded edge 16 to peripheral edges 45 along the inlet side of fluid filter 10 unless obstructed by inlet tube 50. The fluid flow spacing elements 43 obstructed by elliptical inlet tube 50 terminate at the inlet tube and are integral therewith. with.

As shown in FIG. 7, upper sheet 12 and lower sheet 13 of filtration media envelope 11 are supported from making contact with each other by envelope spacer grid 80. As shown in FIG. 6, envelope spacer grid 80 comprises a plurality of spacing elements 81 that are substantially parallel to each other and to the fluid flow path 99 (identified in FIG. 4). Spacing elements 81 are also substantially perpendicular to upper sheet section 12 and lower sheet section 13 (best seen in FIGS. 4 and 7). Envelope spacer grid 80 further comprises plate section 83 which extends over inlet 41 (best seen in FIG.

4). Plate section 83 further consists of plate opening 84, which is identical in shape to envelope opening 14 and lies coincident thereto. Spacing elements 81 are integral with plate 83. The underside of spacing elements 81 and plate 83 are coplanar. Spacing elements 81 extend upward from plate 83 to provide support for upper sheet 12. Transverse flow openings 87 (FIGS. 5 and 6) are located on each spacing element 81 that connects to plate 83. Transverse flow openings 87 act to distribute the fluid flow in filtration media envelope 11.

As shown in FIG. 6, the orientation of spacing elements 81 is maintained by a plurality of bridging strips 82, which traverse spacing elements 81 and are integral therewith. Bridging strips 82 are substantially parallel to each other, substantially parallel to upper sheet section 12 and lower sheet section 13, and are substantially perpendicular to spacing elements 81. Bridging strips 82 alternatively traverse the top and bottom side of spacing elements 81.

As shown in FIG. 6, a single spacing element 85 is located along the edge of plate 83 across inlet 41 from where spacing elements 81 terminate. Single spacing element 85 is opposite in orientation to spacing elements 81, but extends similarly from plate 83.

As shown in FIGS. 2 and 3, plate opening 84 lies coincident to and on top of envelope opening 14, which lies coincident to inlet 41. Plate 83 and the peripheral edge of envelope opening 14 are supported by flanged grommet support 54. Plate opening 84 and envelope opening 14 are sealingly fastened to flanged grommet support 54 by elliptical grommet 95 (best seen in FIG. 2).

A raised lip 27 (best seen in FIG. 5b) runs along the topside of the outer edge of peripheral flanged edge 25 coincident to the portions of the underside of edge 25 that contact non-folded edge 19 of upper filtration material sheet section 12. On the remainder of the periphery, flanged edge 25 is flat (see FIG. 5a). A raised lip 47 (FIG. 5b) runs along the entire underside of the outer edge of peripheral flanged edge 45. The shape of these raised lips 27 and 47 respectively include small ridges 28 and 48 which help hold the overmold 60 to the flanged edges 25 and 45.

Figure 9:
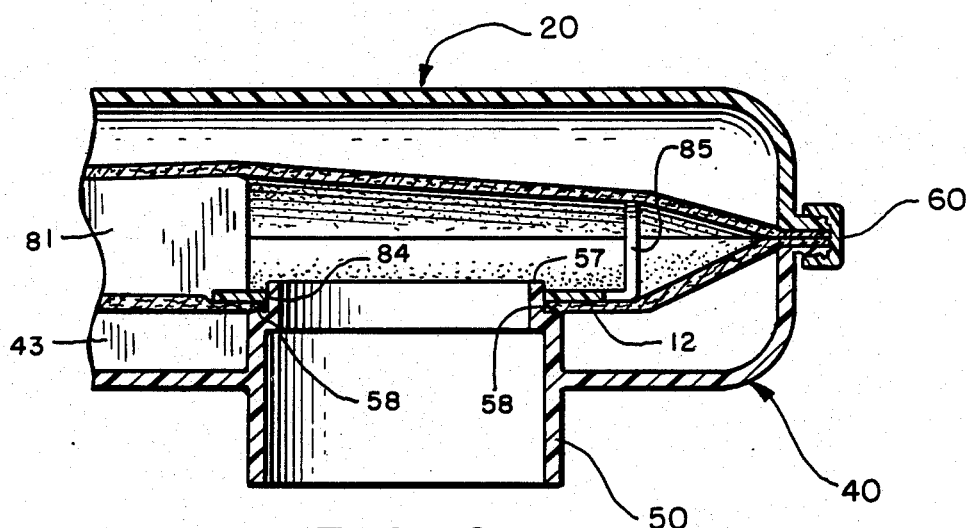
FIG. 9 is a partial sectional view of a second preferred embodiment of the present invention.
Figure 10:
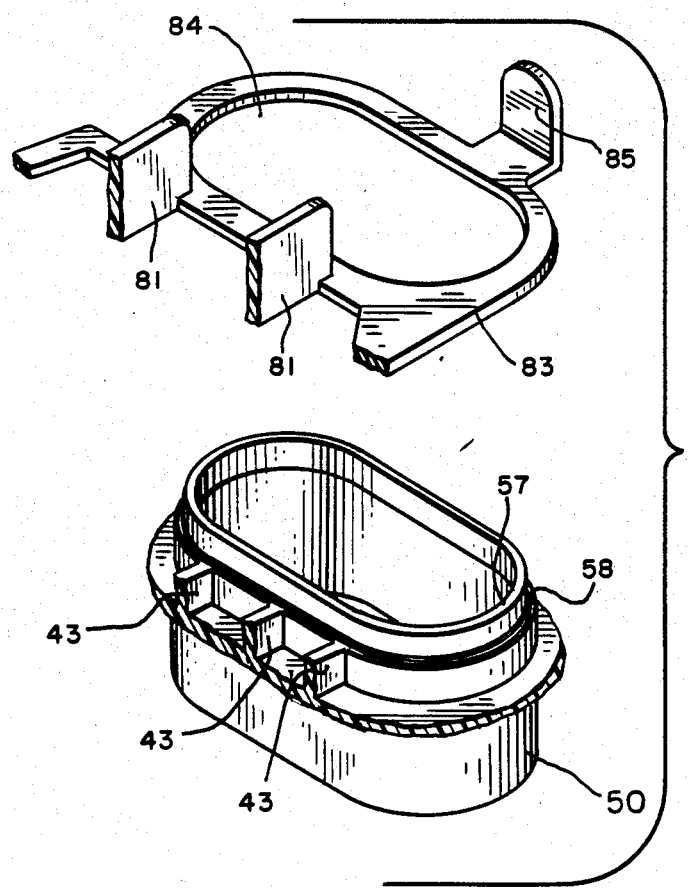
FIG. 10 is an exploded view of portions of the bottom inlet tube and grid plate member of the embodiment of FIG. 9.

In a second preferred embodiment, the grommet 95 is not used, and the shape of the inlet tube 50 is modified slightly. FIGS. 9 and 10 show the construction of the second preferred embodiment, which is identical to the first preferred embodiment except for the items mentioned below. Therefore common reference numerals will be used for both embodiments.

In the preferred embodiment of FIG. 9, the elliptical tube 50 includes an extension 57, which is designed to have an interference fit with the plate opening 84. A weld bead 58 is molded onto the shoulder of the tube 50 around the periphery of the extension 57. During assembly of the filter, the plate 83 is welded to the base member 40, such as by sonic welding, at the weld bead 58. The filtration material 12 is held in place between the plate 83 and the shoulder of tube 50. The benefit of this design is the elimination of the metal grommet 95 and better sealing of the plate 83 to the base member 40. Also, it may be possible to form the weld at weld bead 58 through the filtration media 12, providing an additional seal at the inlet.

In both embodiments, the preferred filter grid 80 is held in place by the rigid connection of the opening 84 and the inlet tube 50. This design has been found useful to maintain the position of the grid 80 inside the envelope 11. The preferred filter grid of both embodiments provides flow through the envelope due to the lateral spacing of the spacing elements 81, and lateral flow through the transverse flow openings 87.

In the preferred embodiments, the cover pan member 20, bottom pan member 40, and overmold 60 are made of glass filled nylon. The filtering material is a phenolic resin-impregnated polyester felt having a retention of 60 micron size particles. Of course, other filtering materials may be used in constructing filters which benefit from the envelope spacer grid of the present invention.

Methods of preventing envelope collapse other than the grid 80 may be used, such as internal support columns, which are held in position by pins which extend through the columns and the filter media (in a sealed fashion) and attach to the base walls. Other shapes of internal support means may be used, as well as supports external to the envelope.

Since other changes and modifications to the presently preferred embodiments may be made without departing from the invention, it should be understood that the preferred embodiments of the filter of the present invention described in detail herein are merely illustrative of various aspects of the invention, and that the invention is not limited thereto. It is intended that the following claims, including all equivalents, therefore define the present invention.

The invention claimed is:

1. A fluid filter for use in a system wherein fluid is forced through the filter by a suction source connected to the filter outlet, the filter comprising:
   (a) a housing to define an enclosed volume with a filter inlet and outlet wherein said outlet leads to the suction source;
   (b) a filtration media envelope inside said volume having an envelope inlet connected to said filter inlet such that fluid entering said filter inlet directly enters the filtration media envelope;
   (c) envelope spacing means within said filtration media envelope to support said envelope against collapse; and
   (d) fluid flow spacing means between said housing and said envelope providing a fluid flow path such that fluid entering said envelope inlet and filtering through said filtration media flows to said outlet.

2. The filter of claim 1 wherein the envelope inlet is coincident with said filter inlet.

3. The filter of claim 1 wherein the envelope spacing means comprises a grid inside said envelope.

4. The filter of claim 1 wherein the filtration media comprises resin-impregnated felt.

5. A fluid filter for use in a system wherein fluid is forced through the filter by suction created by a pump connected to the filter outlet, the filter comprising:
   (a) a pair of generally concave pan members having peripheral edges fastened in opposed relation and respective base surfaces spaced from each other to form an enclosed volume;
   (b) fluid flow spacer means integral with each of said pan member base surfaces and projecting into said volume; and
   (c) an inlet and outlet to said volume with a sheet of filtration material interposed therebetween inside said volume and disposed so as to create an envelope whereby
      (i) the opening to said envelope is coincident to said filter inlet such that fluid entering the filter inlet directly enters the filtration material envelope,
      (ii) facing sheet sections of said envelope are supported against contact with said pan member base surfaces by said integral fluid flow spacer means, and
      (iii) said facing sheet sections of said velope are supported against contact with each other by envelope spacer means within said envelope.

6. The filter of claim 5 wherein said fluid flow spacer means are located so as to direct a line of flow from said inlet to said outlet of said volume.

7. The filter of claim 5 wherein said envelope spacer means comprises spacing elements interconnected so as to define a self-supported unit non-obtrusive to he fluid flow.

8. The filter of claim 7 wherein the envelope spacer means is connected to one of said filter pan members to position said envelope spacer means.

9. The filter of claim 8 wherein said envelope spacer means comprises a plate section having an opening therethrough, and wherein the plate section and said envelope are sealingly fastened at their openings to said filter inlet such that said openings are coincident to said inlet.

10. The filter of claim 9 wherein a metal grommet acts to fasten said envelope spacer means plate section and said filter and envelope inlets together.

11. The filter of claim 9 wherein the plate section plastic and the filter pan member to which it is connected is plastic, and the plastic plate section and pan member are united at a weld bead.

12. An automatic transmission fluid filter, designed for use with a pump which draws the fluid from a sump through the filter, the filter comprising:
   (a) a pair of cup-shaped plastic pan members having peripheral edges fastened in opposed relation and respective generally flat base walls spaced from each other to form an enclosed volume;
   (b) fluid flow spacer means integrally molded with each of said pan member base walls and projecting into said volume;
   (c) an inlet and outlet to said volume with a sheet of filtration material interposed therebetween inside said volume, said sheet being folded upon itself with
      (i) its non-folded edges sealingly captured between said opposed peripheral edges of said pan members such that the folded edge of said sheet is disposed within said volume and is spaced from the opposed peripheral edges of said pan members,
      (ii) facing sections of said folded sheet being supported against contact with said pan members by said fluid flow spacer means, and
      (iii) said sheet having an opening sealingly fastened to said filter volume inlet to admit fluid entering said filter directly into the space within said folded sheet; and
   (d) an envelope spacer grid within said folded sheet, supporting facing sections of said folded sheet against contact with each other.

13. The automatic transmission fluid filter of claim 12 wherein said fluid flow spacer means are aligned in parallel fashion to define a fluid flow path.

14. The automatic transmission fluid filter of claim 12 wherein said envelope spacer grid is comprised of two or more spacing elements situated in a substantially parallel fashion to define a fluid flow path.

15. The fluid filter of claim 14 wherein the envelope spacer grid further comprises bridging strips connected to said spacing elements so as to maintain the substantially parallel orientation of the spacer elements.

16. The fluid filter of claim 12 wherein the envelope spacer grid further comprises a plate section having an opening therethrough, and said grid being positioned such that said plate section opening is coincident to said opening of said sheet and filter volume inlet.

17. The fluid filter of claim 16 wherein said plate section of said envelope spacer grid further comprises one or more spacing elements located on the opposite side of said opening from said substantially parallel spacing elements 18. The automatic transmission fluid filter of claim 16, further comprising a grommet whereby said plate section and said sheet are sealingly fastened to said filter volume inlet at their openings such that said openings are coincident to said filter volume inlet.

19. The automatic transmission fluid filter of claim 16 wherein said plate section is plastic and is sealingly welded to one of said filter pan member at the periphery of said filter volume inlet.

20. The automatic transmission fluid filter of claim 12 wherein the plastic pan members and sheet of filtration material include a plurality of positioning tangs and holes for use in aligning the pan members and filtration material during assembly of the filter.

21. The fluid filter of claim 1 wherein the housing comprises cup-shaped pan members having peripheral edges fastened in opposed relation and wherein the filter further comprises a plastic overmold around the periphery of the filter hermetrically sealing the peripheral edges of the pan member.

22. The fluid filter of claim 5 further comprising an overmold hermetrically sealing the peripheral edges of the pan members.

23. The filter of claim 12 further comprising an overmold hermetrically sealing the peripheral edges of the pan members.

* * * * *

UNITED STATES PATENT AND TRADEMARK OFFICE
CERTIFICATE OF CORRECTION

PATENT NO. : 4,828,694
DATED : May 9, 1989
INVENTOR(S) : Hayden Leason

It is certified that error appears in the above-identified patent and that said Letters Patent is hereby corrected as shown below:

On the cover page under the heading "Inventor", after "Humacao" please insert --P.R.--.

IN THE BRIEF DESCRIPTION OF THE DRAWINGS
    In column 2, line 15, please delete "of".

IN THE DETAILED DESCRIPTION
OF THE PREFERRED EMBODIMENTS
    In column 3, line 14, after "a" please delete --.--.
    In column 3, line 30, after "5b)" please insert --.--.
    In column 3, line 57, please delete "with".

IN THE CLAIMS
    In column 6, line 5, please delete "velope" and substitute therefor --envelope--.
    In column 6, line 13, please delete "he" and substitute therefor --the--.
    In column 7, line 14, after "elements" please insert --.--.

UNITED STATES PATENT AND TRADEMARK OFFICE
CERTIFICATE OF CORRECTION

PATENT NO. : 4,828,694
DATED : May 9, 1989
INVENTOR(S) : Hayden Leason

It is certified that error appears in the above-identified patent and that said Letters Patent is hereby corrected as shown below:

In column 8, line 16, please delete "hermetrically" and substitute therefor --hermetically--.

In column 8, line 19, please delete "hermetrically" and substitute therefor --hermetically--.

Signed and Sealed this

Seventh Day of January, 1992

Attest:

HARRY F. MANBECK, JR.

*Attesting Officer*     *Commissioner of Patents and Trademarks*